(12) United States Patent
Von Allmen et al.

(10) Patent No.: US 8,608,142 B2
(45) Date of Patent: Dec. 17, 2013

(54) DEVICE FOR ABSORBING KINETIC ENERGY OF A MOVING BODY

(75) Inventors: Hans Peter Von Allmen, Tafers (CH); Toni Baer, Schwanden bei Brienz (CH); Rudolf Rüegsegger, Zollikofen (CH)

(73) Assignee: Geobrugg AG, Romanshorn (CH)

( * ) Notice: Subject to any disclaimer, the term of this patent is extended or adjusted under 35 U.S.C. 154(b) by 54 days.

(21) Appl. No.: 13/319,364

(22) PCT Filed: May 2, 2010

(86) PCT No.: PCT/EP2010/002666
§ 371 (c)(1),
(2), (4) Date: Nov. 10, 2011

(87) PCT Pub. No.: WO2010/127812
PCT Pub. Date: Nov. 11, 2010

(65) Prior Publication Data
US 2012/0061195 A1    Mar. 15, 2012

(30) Foreign Application Priority Data
May 5, 2009   (CH) .................................... 0704/09

(51) Int. Cl.
*F16F 1/00* (2006.01)
(52) U.S. Cl.
USPC ........................................... 267/170; 267/72

(58) Field of Classification Search
USPC ................... 267/69, 73, 74, 169, 174, 179
See application file for complete search history.

(56) References Cited

U.S. PATENT DOCUMENTS

| | | | | |
|---|---|---|---|---|
| 1,194,417 | A * | 8/1916 | Pelham | 267/72 |
| 2,181,954 | A * | 12/1939 | Wallat | 267/170 |
| 4,358,136 | A | 11/1982 | Tsuge et al. | |
| 4,909,866 | A * | 3/1990 | Abe et al. | 148/333 |
| 5,332,071 | A | 7/1994 | Duncan | |
| 5,624,321 | A * | 4/1997 | Snyder | 472/118 |
| 6,260,833 | B1 * | 7/2001 | Drager | 267/72 |
| 6,964,412 | B2 * | 11/2005 | Costello et al. | 267/179 |
| 7,717,411 | B2 * | 5/2010 | Izumida et al. | 267/166 |

FOREIGN PATENT DOCUMENTS

| | | |
|---|---|---|
| JP | 5-231032 A | 9/1993 |
| WO | 01/87420 A | 11/2001 |

* cited by examiner

*Primary Examiner* — Christopher Schwartz
(74) *Attorney, Agent, or Firm* — Brian Roffe

(57) ABSTRACT

Device for absorbing kinetic energy of a moving body includes a plastically deformable helical spring having a stack of convolutions, the inner surfaces of which delimit a passage. At least a part of the convolutions can be pulled successively through the passage. Due to the resulting deformation of the convolutions, energy can be absorbed.

20 Claims, 2 Drawing Sheets

DEVICE FOR ABSORBING KINETIC ENERGY OF A MOVING BODY

The invention relates to a device for absorbing kinetic energy of a moving body having a tension member that comprises a plastically deformable helical spring having a stack of convolutions, the inner surface of which delimits a passage.

BACKGROUND OF THE INVENTION

Devices in which energy is absorbed by stretching a tension member against its material and form resistance are used in many areas of application, such as e.g. fall brakes in mountaineering or assembly work in the construction trade, as so-called "shock absorbers" for safety belts in automotive engineering, or as brakes in dynamically stressed supporting structures such as safety nets, rope barriers and the like.

Plastically deformable tension members are preferred here because with predominantly elastic deformability, as provided e.g. by non-overstretched springs made of spring steel or rubber straps, the kinetic energy absorbed was only temporarily stored and then the majority of it was returned to the braked body, which would set the latter in motion again.

With energy absorption a constant development of the braking force over the whole braking path is desirable because in this way the moving body is braked with constant negative acceleration and so is subjected to forces which remain uniform.

However, when subjected to tension, tension members in the form of elastically or plastically deformable helical springs do not have constant spring forces over the range of the spring. With a helical spring the spring force rises as the range of the spring increases because all of the convolutions are stressed simultaneously by the latter stretching with simultaneous reduction of the convolution diameter and increase in the pitch, and so constantly increase their resistance to further stretching.

OBJECTS AND SUMMARY OF THE INVENTION

It is the object of the present invention to specify a device having a tension member which can be stretched over the bigger part of the whole braking path with the most constant possible braking force.

A device that achieves these objects includes a stack of convolutions having a first part including at least one convolution the inner surface of which defines a passage, and a second part including at least one convolution that each have a diameter smaller than a diameter of the convolution(s) in the first part and a pitch larger than a pitch of the convolution(s) in the first part arising from deformation of the convolution(s) in the second part relative to the convolution(s) in the first part, with the convolution(s) in the second part of the stack of convolutions being at least partially situated in the passage defined by the first part of the stack of convolutions. The dependent claims specify preferred embodiments of the device according to the invention.

BRIEF DESCRIPTION OF THE DRAWINGS

The invention is further explained by means of exemplary embodiments with reference to figures. These show as follows.

DETAILED DESCRIPTION OF THE INVENTION

Figure 1:
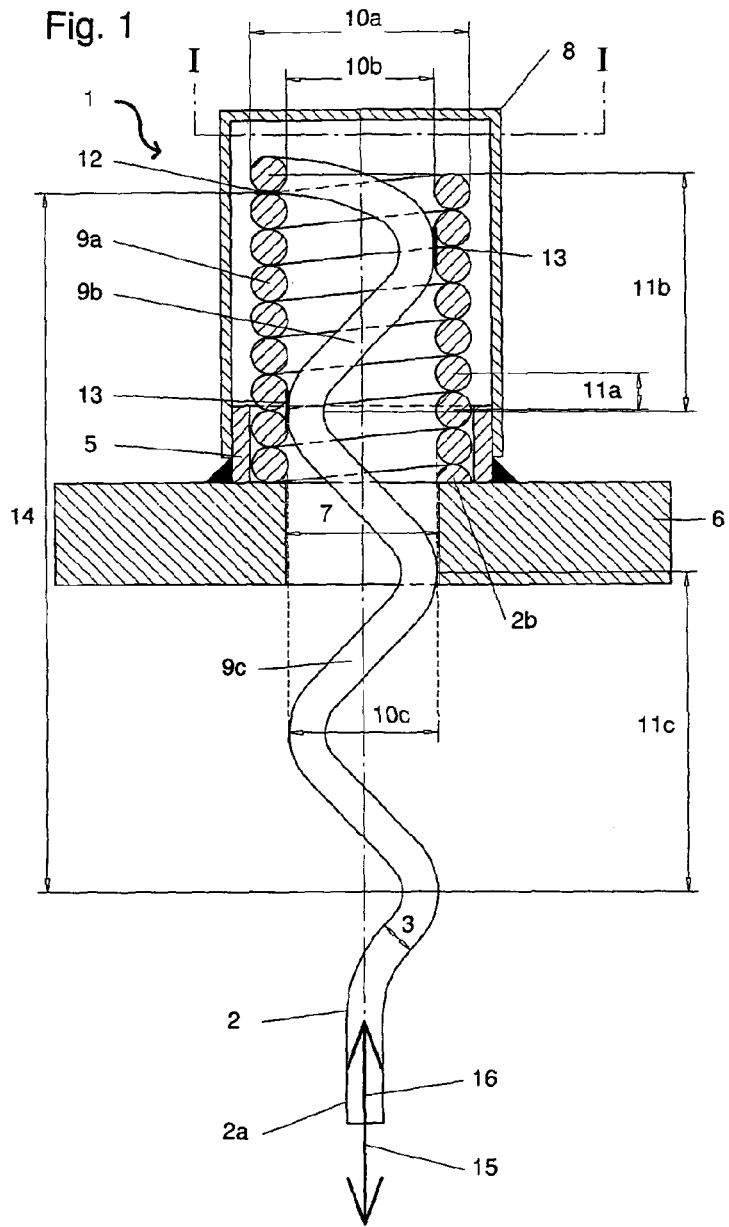
FIG. 1 is a longitudinal section through a device according to the invention in the stressed state.

FIG. 1 shows a device 1 according to the invention after partial subjection to an external force 15 which acts upon a tension member 2, and so brings about a braking force 16 in the opposite direction to the force 15. The tension member 2 is in the form of a helical spring with a number of 360° convolutions 9a, 9b, 9c. 9a designates the part of the convolutions which are stacked on top of one another and have not yet been subjected to the force 15. 9b designates the part of the stressed convolutions which extends within the non-stressed convolutions 9a, whereas 9c is the part of the stressed convolutions which projects out of the lower end of the non-stressed convolutions 9a according to FIG. 1. In the following, this lower end of the stack of convolutions 9a is also called the support end of the stack, whereas the free end designates the upper end of the stack of convolutions 9c according to FIG. 1.

The helical spring is formed from a wire with the wire diameter 3 and is plastically deformable. In FIG. 1 the deformed tension member 2 is shown after stretching by the braking distance 14.

The stack of 360° convolutions 9a is closed by a protective hood 8. The support end of this stack is surrounded by a centring ring 5 and rests against a supporting plate 6 connected securely to the latter. Said supporting plate is provided with a through-hole 7 the diameter of which corresponds at least to the internal diameter of the convolutions 9a.

The part of the convolutions 9b which is progressively plastically deformed adjoins the stacked part of the convolutions 9a of the tension member 2, and this is followed by the part of the convolutions 9c which are not deformed any further.

The non-stressed convolutions 9a are stacked with the convolution diameter 10a and the pitch 11a. The stack of convolutions 9a with the end of the tension member 2b is supported on the supporting plate 6 and is positioned over the through-hole 7 by means of the centring ring 5.

The centring ring 5 and the supporting plate 6 form stop means which guarantee that the stack of convolutions 9a retains its position when the convolutions 9b are deformed. In particular, by providing the centring ring 5 a stop surface is created which prevents displacement of the stack laterally to its direction of extension, and so that passage is always aligned with the through-hole 7.

An external force 15 acting at the start of the tension member 2a and which originates from the tension which is caused by the movement of the body to be braked brings about a braking force 16 in the opposite direction to the force 15. By means of the convolutions 9a being pulled successively through the passage, delimited by the inner surface of the stack of convolutions 9a and the through-hole 7 of the support plate 6, the convolutions 9a are deformed via the intermediate form 9a into convolutions 9c with the smaller convolution diameter 10c and the greater pitch 11c. The intermediate form 9a has a convolution diameter 10b and a pitch 11b. The deformation of the tension member 2 takes place such that the respective convolution diameter 10a, 10b, 10c decreases while the respective pitch 11a, 11b, 11c increases.

When deformed the convolution 9b slides over the convolution 9a lying beneath it, the contact point 12 located between them progressively changing so that the new surface of the convolution 9b always slides over the new surface of the convolution 9a lying below it. When the convolutions 9a are pulled through the passage, delimited by the inner surface of the stack of convolutions 9a and the through-hole 7 of the supporting plate 6, the convolutions 9b slide along the surfaces of the convolutions 9a, the contact points 13 located between the latter progressively changing so that the new surface of the convolution 9a always slides over the surface of the stack of convolutions 9a.

The portion of sliding friction on the braking force (designated as 16 in FIG. 3) resulting from the portions at the contact points 12 and 13 adopts an approximately constant value in addition to the main portion of plastic deformation of the convolutions 9b over the whole braking path (designated as 14 in FIG. 3) so that the braking force 16 as a whole remains uniform over the braking path 14.

The centring ring 5 has an axial length which is smaller than the length of the stack of convolutions 9a and preferably only surrounds a few of the convolutions 9a on the support end of the stack. Therefore, the free end of the latter is not surrounded by the centring ring 5, by means of which additional friction between the tension member 2 and the centring ring 5 is avoided when the respective outermost convolution 9a at the free end of the stack starts to deform.

In order to reduce the sliding friction at the contact points 12 and 13, the gliding properties and the wear resistance of the surface of the wire or wires can be improved e.g. by salt bath nitrocarburizing (e.g. according to the Tenifer QPQ method, QPQ standing for Quench/Polish/Quench). Other measures for surface treatment are also conceivable in order to reduce the sliding friction. Under certain circumstances e.g. polishing the surface of the wire is sufficient.

In order to facilitate connection of the tension member 2a to the body to be braked provision can already be made when producing the device 1 such that the start 2a of the tension member 2 is pulled through the stack of windings 9a or at least projects into the latter. Furthermore, the start 2a can be provided with an appropriate attachment device which serves, e.g. to attach a rope.

Figure 2:
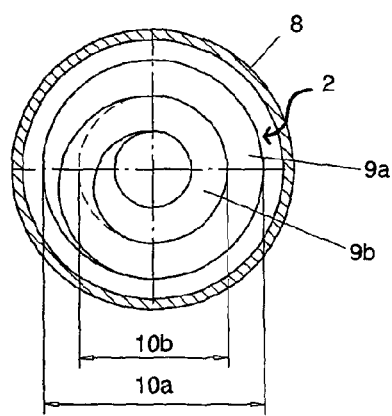
FIG. 2 is the section I-I through the device from FIG. 1.

FIG. 2 shows the section I-I through the device of FIG. 1 with the protective hood 8 which surrounds the stacked convolutions 9a with the convolution diameter 10a and which are successively pulled as a plastically deformed convolution 9b with the convolution diameter 10b through the passage delimited by the inner surface of the convolutions 9a and the through-hole 7.

Figure 3:
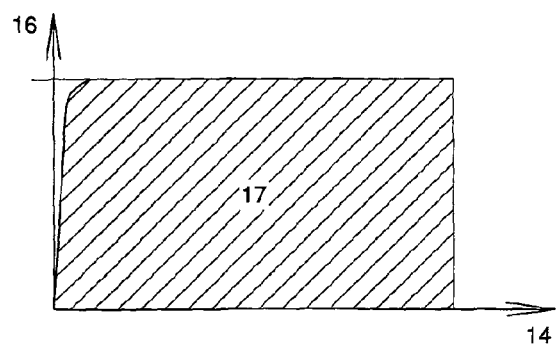
FIG. 3 is a braking force/braking path diagram.

FIG. 3 shows the development of a braking force/braking path diagram when the device 1 according to FIG. 1 is stressed. As can be seen, over a very short braking path 14 the braking force 16 reaches its final value which remains practically uniform over the rest of the braking path 14. The area 17 below the curve corresponds to the absorbed energy 17 resulting from the braking force 16 and the braking path 14 when the device 1 according to FIG. 1 is stressed.

Figure 4:
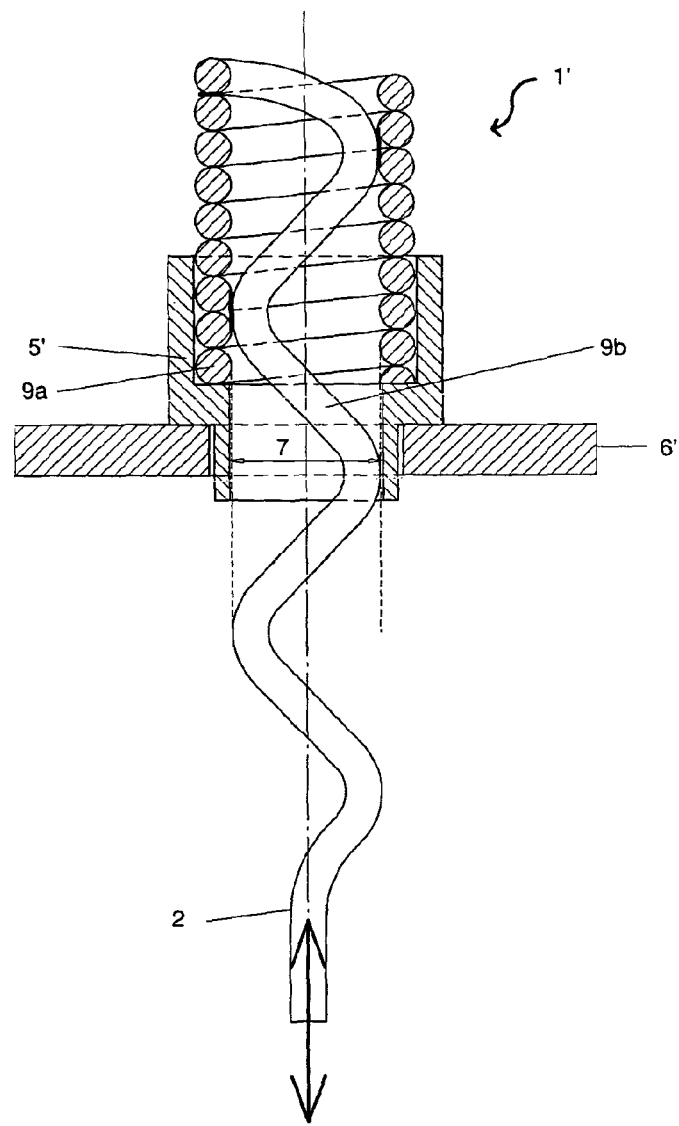
FIG. 4 is a longitudinal section of a further variant of a device according to the invention.

FIG. 4 shows a further variant of the device 1' according to the invention. Stop means are provided here in the form of a casing 5' which is designed to taper by forming a step. The stacked convolutions 9a rest against the step of the casing 5', whereas the deforming convolution 9b projects through the smaller hole in the casing 5' the diameter 7 of which is chosen to correspond to the variant according to FIG. 1. The tapered end of the casing 5' engages in a hole formed in a carrier 6'.

The casing 5' serves on the one hand as a support for the tension member 2, and on the other hand as a side stop which prevents the tension member 2 from swerving to the side when subjected to stress. The casing 5' can be produced from one piece.

The carrier 6' can be e.g. an already existing prop or the like in which a hole is drilled for fitting the device 1', and then the tapered end of the casing 5' is inserted.

The device according to the invention can be used in many different ways, e.g. as a fall brake, as used in mountaineering or assembly work in the construction trade, as a "shock absorber" for safety belts in automotive engineering and/or as a brake in dynamically stressed supporting structures such as safety nets, rope barriers and the like.

The device 1, 1' is designed to correspond to the application. The range of braking forces e.g. for fall protection for people comes within the range of two to three kN with braking path lengths of from a few decimeters to one to two meters. With dynamically stressed supporting structures a braking force of up to 200 kN or greater may be required with braking path lengths of a number of meters.

Tension members are preferably made of round wires with a diameter in the range of a few millimeters to a few centimeters and which have tensile strengths of 500 to 2000 N/mm$^2$, wires which also have a high degree of ductility being particularly preferred. Among others, steel wire is suitable as a tension member.

The above description makes numerous modifications accessible to the person skilled in the art without straying from the scope of protection of the invention defined by the claims.

Instead of a solid profile, a hollow profile such as e.g. a thick-walled steel pipe can also be used as a tension member 2.

It is also conceivable to use as a tension member 2 a twisted steel pipe through the interior of which a rope is guided which acts as the primary tension member and thereby transfers the external forces 15 onto the convolutions (9a, 9b, 9c) and so mobilises the braking force 16. The external force 15 is thereby transferred via the rope after the braking.

Furthermore, the stack of non-stressed convolutions 9a does not necessarily need to have, as shown in the figures, a circular cylindrical external form. Other forms are also conceivable, e.g. those in which the stack becomes constantly wider or narrower towards one and/or the other end.

The invention claimed is:

1. A device for absorbing kinetic energy of a moving body, comprising:
    a tension member which comprises a plastically deformable helical spring having a single stack of convolutions,
    the stack of convolutions having a first part including at least one convolution, an inner surface of the first part of the stack of convolutions defining a passage,
    the stack of convolutions having a second part including at least one convolution, each of the at least one convolution in the second part of the stack of convolutions having a diameter smaller than a diameter of the at least one convolution in the first part of the stack of convolutions and a pitch larger than a pitch of the at least one convolution in the first part of the stack of convolutions arising from deformation of the at least one convolution in the second part of the stack of convolutions relative to the at least one convolution in the first part of the stack of convolutions,
    at least a portion of the second part of the stack of convolutions being situated in the passage defined by the first part of the stack of convolutions; and
    stop means for retaining a position of the stack of convolutions, the stop means comprising a support that supports the first part of the stack of convolutions, the support including a through-hole communicating with the passage defined by the first part of stack of the convolutions, at least a portion of the second part of the stack of convolutions being situated in the through-hole in the support.

2. The device according to claim 1, wherein the stop means further comprise a stop surface that blocks displacement of the first part of the stack of convolutions laterally to a direction of extension.

3. The device according to claim 2, wherein the support and the stop surface are part of a casing, the casing including a step on which an extreme one of the convolutions in the first part of the stack of convolutions rests.

4. The device according to claim 2, the first part of the stack of convolutions projects over the stop surface as viewed in the direction of extension of the passage.

5. The device according to claim 1, wherein the support is a casing and the stop means further comprise a supporting plate having an aperture through which part of the casing defining the through-hole passes.

6. The device according to claim 5, wherein the casing includes a step on an inner surface, the first part of the stack of convolutions resting on the step.

7. The device according to claim 5, wherein the casing includes a side wall that surrounds only a portion of the first part of the stack of convolutions to thereby limit lateral extension of the at least one convolution in the first part of the stack of convolutions.

8. The device according to claim 1, wherein the stop means further comprise a ring arranged on the support, the ring surrounding only a portion of the first part of the stack of convolutions.

9. The device according to claim 8, wherein the ring rests on and is connected to the support.

10. The device according to claim 1, wherein the through-hole in the support has a diameter that corresponds to at least an internal diameter of the first part of the stack of convolutions.

11. The device according to claim 1, wherein before stressing the device by means of the body, an end of the helical spring adjacent the second part of the stack of convolutions projects into the passage of the first part of the stack of convolutions or is passed through the passage defined by the first part of the stack of convolutions.

12. The device according to claim 1, wherein the at least one convolution in the first part of the stack of convolutions comprises a plurality of convolutions, and the convolutions of the first part of the stack of convolutions have substantially the same diameter.

13. The device according to claim 1, wherein the at least one convolution in the first part of the stack of convolutions comprises a plurality of convolutions, and the convolutions of the first part of the stack of convolutions have a diameter that becomes constantly greater or smaller at the start and/or end of the stack of convolutions.

14. The device according to claim 1, wherein the tension member is made of wire, the tensile strength of which is at least 500 N/mm$^2$ and/or maximum 2000 N/mm$^2$.

15. The device according to claim 1, wherein the tension member is made of steel wire which has a round cross-section and/or is corrosion-resistant.

16. The device according to claim 1, wherein the surface of the at least one convolution of the first part of the stack of convolutions is treated to be smoother and/or more wear-resistant.

17. The device according to claim 1, further comprising a protective hood arranged over and around the first part of the stack of convolutions.

18. The device according to claim 1, wherein the second part of the convolutions extends outward from the through-hole.

19. The device according to claim 1, wherein the helical spring consists of a single wire.

20. The device according to claim 1, wherein the first part of the stack of convolutions is positioned such that the passage defined thereby aligns with the through-hole in the support.

* * * * *